2,834,711

PRODUCTION OF BACITRACIN

Eli Zinn, Painesville, Ohio, and Francis W. Chornock, Farmersburg, Ind., assignors to Commercial Solvents Corporation, Terre Haute, Ind., a corporation of Maryland No Drawing. Application May 17, 1956
Serial No. 585,380

8 Claims. (Cl. 167—65)

Our invention relates to the recovery of bacitracin. More particularly, it relates to a process for the recovery of bacitracin by zinc precipitation and ion exchange.

This application is a continuation-in-part of our copending application Serial No. 341,810, filed March 11, 1953, now abandoned.

The antibiotic bacitracin is produced by the propagation of the organism *Bacillus subtilis* on a nutrient medium under aerobic conditions in much the same manner as penicillin is produced. The bacitracin in the fermented medium, however, is present only in relatively small quantities, i. e. of the order of 50 to 100 units per milliliter. The separation and recovery of this small amount of material from a large volume of medium of complex character presents numerous difficulties.

The prior processes are illustrated by the disclosure in U. S. Patent 2,582,921, granted January 15, 1952, to Jesse Charney. According to the disclosure of this patent, the original bacitracin fermentation broth is first freed of the producing organism, made acid to a pH of approximately 4, and then treated with a coagulating agent such as ferric or aluminum chloride. The coagulum is then separated from the fermentation broth by any suitable means and the clarified fermentation broth then admixed with a zeolitic material which absorbs the bacitracin from the fermentation broth. The broth is then discarded and the bacitracin eluted from the zeolitic material with an alkali to produce a bacitracin solution with alkaline cations. The bacitracin solution is then neutralized with acid and dried to produce bacitracin mixed with a salt or the bacitracin solution of alkaline cations can be neutralized with an acid containing an anion which precipitates the alkaline cation after which the precipitate can be removed and the bacitracin solution dried to obtain solid, salt-free bacitracin.

Also illustrative of prior processes for the recovery of bacitracin is the disclosure of U. S. Patent 2,556,375, granted June 12, 1951, to Regna and Solomons. According to this method bacitracin is precipitated from fermentation broths in the form of a dye salt by combining the bacitracin with the dye known as Polar Yellow 5G, recovering the precipitate, dissolving the bacitracin Polar Yellow 5G salt in dilute alkali, extracting the bacitracin dye salt from aqueous solution with butyl alcohol and treating the alcohol solution with an acid to extract the Polar Yellow 5G in the organic phase and drive the mineral acid salt of bacitracin into the aqueous phase from which it can be recovered by drying methods such as evaporation, freeze-drying, etc.

We have now discovered a new process for recovery of bacitracin which process results in bacitracin in higher yields and of higher potency than has heretofore been obtained by prior processes. Furthermore our process is economical and direct and does not require expensive materials or equipment.

Our invention consists essentially of precipitating bacitracin from a water solution by adding a water-soluble zinc salt to the aqueous solution of bacitracin, recovering the precipitate and dissolving it in water at a pH not substantially in excess of about 4 and then removing the zinc ion by passing the aqueous solution through a cation exchange resin. The bacitracin solution from the cation exchange resin contains some acid depending upon the material used to regenerate the resin but can be made acid-free by passing the aqueous solution through an anion exchange resin. The aqueous solution of bacitracin can then be dried to obtain solid, purified bacitracin of high potency and in good yield.

Our new process can be employed to recover bacitracin directly from the nutrient medium in which it is produced following removal of the water-insoluble solids and polishing of the aqueous solution by raising and/or lowering the pH of the aqueous solution to precipitate any impurities insolubel in the aqueous solution at the varied pH condition and then readjusting the aqueous solution to the original pH. When such an aqueous solution is employed as the starting material in our process however, the final product consisting of dry solid bacitracin has a potency of from about 10 to about 30 units per milligram. When the aqueous solution of bacitracin above referered to is partially purified and concentrated to increase the amount of bacitracin per unit volume, the potency of the final dried product can be considerably increased to a value between about 50 and 70 units per milligram. Because of this difference in potency of the final product, we prefer to partially purify and concentrate the aqueous solution of bacitracin obtained by removing water-insoluble solids and polishing the nutrient medium in which bacitracin is produced. This purification and concentration can be accomplished by any means such as for example by the process disclosed in U. S. Patent 2,609,324, issued September 2, 1952, to Murray Senkus and Peter C. Markunas. Another suitable method for obtaining partially purified, concentrated aqueous solutions of bacitracin is disclosed in U. S. Patent 2,582,921, issued January 15, 1952, to Jesse Charney.

In carrying out our new process for recovering and purifying bacitracin we first add a water soluble zinc salt to an aqueous solution of bacitracin at a low pH and then precipitate zinc bacitracin by raising the pH. Any water soluble zinc salt such as for example zinc chloride, zinc sulfate, zinc acetate, etc. may be employed. For precipitation of zinc bacitracin the pH of the solution is preferably adjusted to 7.0 though precipitation can be done at pH 9 or higher. However, bacitracin is unstable at alkaline pHs and the losses are high at pH 9 and above. Appreciable precipitation begins to take place when a pH of 5.0 is reached. We have found that precipitation at pH 7.0 avoids excessive losses of bacitracin from decomposition and insures complete precipitation of the bacitracin present. For best yields we employ at least about 1.1% zinc salt by weight in the solution in our process. Amounts above 1.1% do not appear to further increase the bacitracin precipitated while amounts below 1.1% steadily decrease the bacitracin precipitated as the amount decreases, only about 25–30% of the bacitracin being precipitated when 0.1% zinc salt by weight is employed.

Following precipitation of the zinc bacitracin, the precipitate is removed by any suitable means such as for example by filtration, centrifugation, etc. The aqueous liquid left is essentially a water solution of impurities from which the bacitracin has been separated, a considerable purification of bacitracin being effected by this step.

The precipitate which is removed is then dissolved in water at a pH not substantially in excess of about 4.0 and the solution passed through a cationic-type ion exchange resin to effect removal of the zinc ion from the solution of bacitracin. While the adjustment of the pH can be effected with any suitable acid, we prefer to employ an acid having the same anion as the zinc salt used as a precipitating agent in originally precipitating zinc bacitracin. The cationic-type ion exchange resin which we employ for removal of the zinc ion can be either of the two generally known acid types, i. e. carboxylic or sulfonic acid type cation exchange resins.

Upon passing the aqueous solution of zinc bacitracin through the cation exchange resin, the zinc ion is exchanged for the cation of the exchange resin which can be the hydrogen ion if acid is used to regenerate the resin or some other cation if a salt is employed to regenerate the exchange resin. In generating the cation exchange resin we prefer to employ an acid or salt having the same anion as the original zinc salt employed as a precipitating agent in precipitating the zinc bacitracin from the original aqueous solution of bacitracin. For example, when zinc chloride is used as the precipitating agent in precipitating zinc bacitracin, we prefer to employ either hydrochloric acid or a metal chloride such as sodium chloride for regeneration of the cationic-type ion exchange resin.

The effluent from the cationic-type ion exchange resin can be a solution of acid bacitracin, such as, for example, hydrochloride bacitracin depending upon the precipitating agent employed and whether hydrochloric acid is employed for regeneration of the resin. If a salt is employed for regeneration of the resin then the effluent from the cationic-type ion exchange resin is a solution of bacitracin containing salt, the kind of salt present being determined by the precipitating agent employed and the salt used in regenerating the resin. When an acid is employed to regenerate the ion exchange resin, the effluent is quite acidic with a pH generally less than 1.0. Because of the highly acidic nature of the solution, high bacitracin losses occur and it is obivously highly desirable to adjust the pH to a more nearly neutral range by any suitable means in order to minimize the losses of bacitracin as much as possible. Bases such as alkaline earth metal or alkali metal hydroxides can be employed. The bacitracin in the acidic or neutralized effluent from the ion exchange resin can be recovered in dry solid form by removing the water which can be accomplished by any suitable means, such as, for example, by freeze-drying, spray drying, etc.

When acid is used to regenerate the cationic-type ion exchange resin and the effluent solution of bacitracin is highly acidic, we can then pass the acid solution of bacitracin through an anionic-type ion exchange resin to obtain a salt-free solution of bacitracin having a nearly neutral pH. Such a variation in our process produces a product more highly suitable for pharmaceutical purposes since it is salt-free. The effluent from the anionic-type ion exchange resin can be dried by any convenient means such as those described above for drying of the acidic or neutralized effluent from the cationic-type ion exchange resin to obtain the dry solid bacitracin of excellent purity and high potency.

As mentioned above, we can employ sulfonic or carboxylic acid-type cation exchange resins in our process. Examples of such resins are Amberlite IR-120 which is a strong polystyrene nuclear sulfonic acid-type cation exchange resin and Amberlite IRC-50 which is a very strong phenol-formaldehyde carboxylic acid-type cation exchange resin, both resins being produced by Rohm and Haas Corp., Philadelphia, Pennsylvania. Anion exchange resins which we can employ in our process include Amberlite IRA-400 which is a quaternary ammonium hydroxide, hence, very strong anion exchange resin, IR-4B which is a phenol-formaldehyde weak, free amine-type anion exchange resin, these resins also being produced by Rohm and Haas Corp., Philadelphia Pennsylvania.

The description of our process given above includes the use of a cation-type ion exchange resin alone or in combination with an anion-type ion exchange resin. We have also employed and intend to include within the scope of our invention the use of the so-called monobed-type resins such as, for example the following monobed resins produced by the Rohm and Haas Corp., Philadelphia, Pennsylvania: Amberlite MB-1, a mixture of 1 part Amberlite IR-120 (strong sulfonic acid-type) and 3 parts Amberlite IRA-400 (strong quaternary ammonium hydroxide anion-type resin); Amberlite MB-4, a mixture of equal parts Amberlite IR-45 (phenol-formaldehyde mixed amine weak anion-type resin) and Amberlite IR-120 (strong sulfonic acid-type resin); Amberlite MB-6, a mixture of equal parts Amberlite IRC-50 (strong carboxylic acid-type cation exchange resin) and IR-45 (weak anion-type exchange resin). The effluent following passage of the aqueous solution of zinc bacitracin through a monobed resin is the same as that coming from the anion-type resin when both cation and anion-type resins are employed as described above. The bacitracin product obtained when a monobed resin is employed is salt-free just as is the product obtained when both cation and anion exchange resins are employed as described above.

The following examples are offered to illustrate our invention; however we do not intend to be limited to the specific amounts, proportions, or materials contained therein, it being our intention to include all equivalents within the scope of our invention as described in this specification and the attached claims.

*Example I*

A 1545-ml. portion of an aqueous concentrate of bacitracin assaying 1335 units/ml. was treated by adding an aqueous solution of zinc chloride to make a solution containing 1.15% by weight of zinc chloride. The pH was then adjusted to 7.0 and a precipitate formed which was separated by filtration. The bacitracin precipitated amounted to 85% of that originally contained in the solution. The zinc chloride bacitracin precipitate was then dissolved in water at pH 4.0 and the solution passed through a bed of Amberlite IR-120 which had been regenerated with hydrochloric acid, Amberlite IR-120 being a product of the Rohm and Hass Corp., Philadelphia, Pennsylvania. The ion exchange resin removed the zinc ion, 89% of the bacitracin in the aqueous solution of zinc bacitracin being found in the effluent from the ion exchange resin. The effluent from the Amberlite IR-120 column was then divided into two parts, the pH of one part being immediately adjusted to 4.0 and then freeze-dried under vacuum to obtain 8.1 gm. of dry solid bacitracin assaying 40.6 units/mg. for an overall yield from the aqueous concentrate of 58%, the product containing 10.1% by weight chloride ion content. The second part of the effluent from the Amberlite IR-120 column was passed through a column of Amberlite IR-4B, a weakly basic free amine-type anion exchange resin produced by Rohm and Hass Corp., Philadelphia, Pennsylvania. The effluent from the Amberlite IR-4B column was then freeze dried under vacuum to obtain 8.7 gm. of dried, solid bacitracin assaying 58.8 units/mg. for an overall yield of 73% from the aqueous concentrate to the freeze-dried bacitracin product. The $LD_{50}$ of the bacitracin obtained from the second portion was 515±31 units/20 gm. mouse. The chloride content of the dried bacitracin obtained from the second portion was 0.84% by weight.

*Example II*

To a 1810 ml. portion of a char-treated aqueous solution (an aqueous solution which has been treated by adding char i. e. decolorizing carbon to the solution, agitating the solution and then filtering the char and any impurities adsorbed thereon from the solution) of bacitracin assaying 1840 units/ml. was added an aqueous solution of zinc chloride to give a concentration of zinc chloride in the solution of 1.2% by weight. The pH of the solution was then adjusted to 7.0 and the precipitate which formed was filtered from the solution. The bacitracin precipitated as zinc chloride bacitracin amounted to 80% of that originally in the char-treated aqueous solution. The precipitate was then dissolved in water at pH 4.0 and the solution passed through a column of Amberlite MB-4, a monobed ion exchange resin consisting of equal parts Amberlite IR-120 and Amberlite IR-45, the former being a strong sulfonic acid-type cation exchange resin and the latter being a weakly basic anion exchange resin. Amberlite MB-4 is a product of the Rohm and Haas Corp., Philadelphia, Pennsylvania. The effluent from the ion exchange resin was freeze-dried to obtain a yield of 75% dry solid bacitracin from the char-treated aqueous solution originally employed. The assay of the bacitracin product was 59.5 units/mg. and the product contained 60.8 p. p. m. of zinc and 0.97% by weight chloride ion content. The $LD_{50}$ of the bacitracin product was 550 units/20 gm. mouse.

*Example III*

To a 100 ml. portion of a char-treated aqueous solution of bacitracin assaying 1683 units/ml. was added an aqueous solution of zinc sulfate to provide 1.5% by weight zinc sulfate in the total solution. The precipitate which formed was filtered from the solution and then dissolved in water at pH 3.0. The aqueous solution of zinc sulfate bacitracin was then passed through a column of Amberlite IR-120 regenerated with sodium sulfate. The effluent coming from the ion exchange resin was then freeze-dried under vacuum to obtain dry solid bacitracin assaying 46 units/mg., a yield of 78% based on the bacitracin in the char-treated aqueous solution originally employed being obtained. The product was sodium sulfate bacitracin having an $LD_{50}$ of $355 \pm 25$ units/20 gm. mouse.

*Example IV*

To a 2500 ml. portion of an aqueous solution of bacitracin assaying 640 units/ml. was added an aqueous solution of zinc chloride to give a concentration of 1.2% by weight zinc chloride in the final solution. The precipitate which formed was filtered from the solution and then redissolved in water at pH 4.0. The solution of zinc chloride bacitracin was then passed through a column of Amberlite MB-4, a monobed ion-exchange resin described in Example II. The effluent from the column was freeze-dried under vacuum to obtain dry, solid bacitracin assaying 54.5 units/mg., the overall yield of dry solid bacitracin based on bacitracin in the original charred, aqueous solution being 60%.

*Example V*

To a 1000 ml. portion of a char-treated, aqueous solution of bacitracin was added an aqueous solution of zinc sulfate so that the final solution contained 1.5% zinc sulfate by weight. The pH was then adjusted to 8.5 and a precipitate of zinc sulfate bacitracin formed. The precipitated zinc sulfate bacitracin was removed by filtration and assayed and the filtrate was also assayed. It was found that 78% of the bacitracin in the original solution was precipitated by the zinc sulfate.

*Example VI*

To a 100 ml. portion of a char-treated, aqueous solution of bacitracin was added an aqueous solution of zinc acetate so that the final solution contained 1.3% zinc acetate by weight. The pH was adjusted to 7.0 and a precipitate of zinc acetate bacitracin formed. The precipitated zinc acetate bacitracin was removed by filtration and assayed and the filtrate was also assayed. It was found that 84% of the bacitracin in the original solution was precipitated by the zinc acetate.

What we claim is:

1. In a process for purifying bacitracin, the steps which comprise adding a water-soluble zinc salt to an aqueous solution of bacitracin, adjusting the pH to from 5 to 9, recovering the precipitate which forms, dissolving the precipitate in water at a pH not substantially in excess of 4, and removing the zinc ion by passing the aqueous solution through a cation exchange resin.

2. In a process for purifying bacitracin, the steps which comprise adding a water-soluble zinc salt to an aqueous solution of bacitracin, adjusting the pH to from 5 to 9, recovering the precipitate which forms, dissolving the precipitate in water at a pH not substantially in excess of 4, removing the zinc ion by passing the aqueous solution through a cation exchange resin and removing acid from the resulting solution by passing the said solution through an anion exchange resin.

3. In a process for purifying bacitracin, the steps which comprise adding a water-soluble zinc salt to an aqueous solution of bacitracin, adjusting the pH to from 5 to 9, recovering the precipitate which forms, dissolving the precipitate in water at a pH not substantially in excess of 4, and removing the zinc ion and acid by passing the aqueous solution through a monobed ion exchange resin consisting of a cation exchange resin and an anion exchange resin.

4. In a process for purifying bacitracin, the steps which comprise precipitating bacitracin from a partially purified aqueous solution by adding a water-soluble zinc salt to said solution, dissolving the precipitate in water at a pH not substantially in excess of 4 and removing the zinc ion by passing said solution through a cation exchange resin.

5. In a process for purifying bacitracin, the steps which comprise precipitating bacitracin from a partially purified aqueous solution by adding a water-soluble zinc salt to said solution, and removing the zinc ion from an aqueous solution of the precipitate by passing said solution through a cation exchange resin and removing acid from the resulting solution by passing the solution through an anion exchange resin.

6. In a process for purifying bacitracin, the steps which comprise adding a water-soluble zinc salt to a partially purified aqueous solution of bacitracin, adjusting the pH to from 5 to 9, recovering the precipitate which forms, dissolving the precipitate in water at a pH not substantially in excess of 4, and removing the zinc ion by passing the aqueous solution through a cation exchange resin and drying the resulting solution to obtain dry solid bacitracin.

7. In a process for purifying bacitracin, the steps which comprise adding a water-soluble zinc salt to a partially purified aqueous solution of bacitracin, adjusting the pH to from 5 to 9, recovering the precipitate which forms, dissolving the precipitate in water at a pH not substantially in excess of 4, removing the zinc ion by passing the aqueous solution through a cation exchange resin, removing acid from the resulting solution by passing the said solution through an anion exchange resin and drying the resulting solution to obtain substantially pure bacitracin.

8. In a process for purifying bacitracin, the steps which comprise adding a water-soluble zinc salt to a partially purified aqueous solution of bacitracin, adjusting the pH to from 5 to 9, recovering the precipitate which forms, dissolving the precipitate in water at a pH not substantially in excess of 4, removing the zinc ion and salts from the solution by passing the said solution through a monobed ion exchange resin consisting of a cation exchange resin and an anion exchange resin and drying the resulting solution to obtain substantially pure bacitracin.

(References on following page)

References Cited in the file of this patent

UNITED STATES PATENTS

| | | |
|---|---|---|
| 2,516,080 | Sobin et al. | July 18, 1950 |
| 2,528,022 | Van Dolah | Oct. 31, 1950 |
| 2,538,479 | Snyder | Jan. 16, 1951 |
| 2,550,939 | Richardson | May 1, 1951 |
| 2,643,997 | Johnson | June 30, 1953 |

OTHER REFERENCES

Johnson et al.: Res. in Antibiotics, A Symposium at Wash., D. C., Jan. 31–Feb. 1, 1947, 6 pp.

Amberlite: Monobed Deionization, June 1950, pub. by Rohm and Hass Co., Resinous Prod. Div., Phila., Pa., 12 pp., p. 11 pert.

Cohn et al.: J. A. C. S., 1950, pp. 465–474.

Tullis: Blood Cells and Plasma Proteins—Their State in Nature, pub. 1953, Academic Press, N. Y. C., pp. 33–38, 41 and 42.

UNITED STATES PATENT OFFICE

CERTIFICATE OF CORRECTION

Patent No. 2,834,711                                      May 13, 1958

Eli Zinn et al.

It is hereby certified that error appears in the printed specification of the above numbered patent requiring correction and that the said Letters Patent should read as corrected below.

Column 3, line 16, for "generating" read -- regenerating --.

Signed and sealed this 26th day of August 1958.

(SEAL)
Attest:
KARL H. AXLINE

Attesting Officer

ROBERT C. WATSON
Commissioner of Patents